(12) United States Patent
Tsap et al.

(10) Patent No.: US 6,594,381 B2
(45) Date of Patent: Jul. 15, 2003

(54) COMPUTER VISION-BASED TECHNIQUE FOR OBJECTIVE ASSESSMENT OF MATERIAL PROPERTIES IN NON-RIGID OBJECTS

(75) Inventors: Leonid V. Tsap, Livermore, CA (US); Dmitry B. Goldgof, Tampa, FL (US); Sudeep Sarkar, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 09/858,064

(22) Filed: May 15, 2001

(65) Prior Publication Data

US 2001/0040997 A1 Nov. 15, 2001

Related U.S. Application Data

(63) Continuation of application No. 09/322,549, filed on May 28, 1999, now abandoned.

(51) Int. Cl.[7] .................................................. G06K 9/00
(52) U.S. Cl. ...................................... 382/154; 382/128
(58) Field of Search ................................. 382/141, 154, 382/128, 133; 600/109, 306; 702/41, 42; 348/86, 88, 125

(56) References Cited

U.S. PATENT DOCUMENTS

| 4,288,852 A | 9/1981 | Holland | 364/508 |
|---|---|---|---|
| 5,642,293 A | 6/1997 | Manthey et al. | 364/508 |

OTHER PUBLICATIONS

A Vision–Based Technique for Objective Assessment of Burn Scars, L. V. Tsap, D. B. Goldgof, S. Sarkar and P. Powers, IEEE Transactions on Medical Imaging, Aug. 1998 vol. 17, No. 4, pp. 620–633.

Experimental Results of a Vision–Based Burn Scar Assessment Technique, L. V. Tsap, D. B. Goldgof, S. Sarkar and P. Powers, IEEE Workshop on Biomedical Image Analysis WBIA98, pp. 193–201, Santa Barbara, CA, Jun. 1998.

Nonrigid Motion Analysis Based on Dynamic Refinement of Finite Element Models, L. V. Tsap, D. B. Goldgof, and S. Sarkar, IEEE Conference on Computer Vision and Pattern Recognition CVPR98, pp. 728–734, Santa Barbara, CA, Jun. 1998.

*Primary Examiner*—Samir Ahmed
*Assistant Examiner*—Vikkram Bali
(74) *Attorney, Agent, or Firm*—Calfee, Halter & Griswold, LLP

(57) ABSTRACT

The present invention provides a system and method for recovering material properties of non-rigid objects. The method includes, for example, the steps of: establishing a plurality of three-dimensional point correspondences of the non-rigid object in an unstressed and stressed state; from the plurality of point correspondences, generating a finite element model of the non-rigid body having initial material properties and generating a finite element strain distribution; detecting abnormal areas of the non-rigid body by comparing finite element strain levels from the strain distribution; and determining at least one material property of the abnormal areas. The system includes, for example, a general or personal computer with, optionally, one or more digital cameras and range finding devices for acquiring and processing three-dimensional correspondence data associated with the non-rigid object being an unstressed and stressed state. Among the plurality of material properties recoverable by the present invention are material elasticity and geometry. An iterative descent method is utilized to refine the finite element model and recover the missing or estimated material properties.

3 Claims, 10 Drawing Sheets

COMPUTER VISION-BASED TECHNIQUE FOR OBJECTIVE ASSESSMENT OF MATERIAL PROPERTIES IN NON-RIGID OBJECTS

FIELD OF THE INVENTION

The invention relates generally to the motion analysis of non-rigid bodies, and more particularly, to systems and methods for recovering material properties of non-rigid bodies through vision-based motion analysis and finite element modeling.

BACKGROUND OF THE INVENTION

The recovery of material properties of non-rigid objects has many important applications in the medical and industrial arts. For example, non-rigid objects include skin, tissue, rubber, and plastic, just to name a few. Situations often arise where it is desirable to know the material properties of a non-rigid object such as during, for example, medical treatment or quality control during manufacturing processes. These situations include, for example, the detection of abnormalities in the non-rigid objects. Nevertheless, it is sometimes difficult to know the material properties because some non-rigid objects can only be investigated non-invasively. Or said another way, to invasively investigate the non-rigid objects would cause damage to the objects themselves. Additionally, most current non-invasive investigations are quite subjective.

In response to these difficulties, attempts have been made to use non-rigid motion tracking of the objects under investigation. Methods for non-rigid motion analysis are based on having complete, physically-based, mathematical models of the non-rigid object undergoing the motion tracking. However, in many cases the information required to generate a complete physical model of the non-rigid object is often not available. Attempts at generalizing and simplifying such unknown material properties or information compromises the advantages gained from using such models. Therefore, it is desirable to provide a method for accurately analyzing the material properties of non-rigid objects that does not suffer from these disadvantages.

SUMMARY OF THE INVENTION

According to one embodiment of the present invention, a method of analyzing material properties of a non-rigid body is provided. The method includes the steps of: establishing a plurality of three-dimensional point correspondences of the non-rigid object in an unstressed and stressed state; from the plurality of point correspondences, generating a finite element model of the non-rigid body having initial material properties and generating a finite element strain distribution; detecting abnormal areas of the non-rigid body by comparing finite element strain levels from the strain distribution; and determining at least one material property of the abnormal areas. The step of determining at least one material property of the abnormal areas includes a plurality of sub-steps such as, for example: establishing a plurality of boundary point correspondences from the plurality of point correspondences; inputting the boundary point correspondences into the finite element model for generating a predicted set of three-dimensional point correspondences of the non-rigid object in the stressed state; and refining the at least one material property based on a comparison of the predicted set of point correspondences and the set of point correspondences of the non-rigid object in the stressed state until the predicted set of point correspondences and the set of point correspondences of the non-rigid object in the stressed state are within a minimum difference.

The step of establishing a plurality of three-dimensional point correspondences of the non-rigid object in an unstressed and stressed state also includes one or more sub-steps such as for example: determining a first set of three-dimensional point correspondences from a plurality of grid lines overlying the non-rigid object in the unstressed state and range information and determining a second set of three-dimensional point correspondences from the plurality of grid lines overlying the non-rigid object in the stressed state and range information. The step of detecting abnormal areas of the non-rigid body by comparing finite element strain levels from the strain distribution also includes one or more sub-steps such as, for example: identifying finite elements having low stress and identifying finite elements having high stress. The step of refining the at least one material property also includes one or more sub-steps such as, for example: changing the elasticity or geometry of the finite elements. Other embodiments of the present invention include a computer readable medium having computer program logic recorded thereon for determining at least one material property of a non-rigid object through one or more the aforementioned steps.

The present invention is applicable to, for example, burn scar assessment, natural and man-made elastic materials, and human hand modeling. Human hand modeling according to the present invention provides a valuable tool for the analysis of Repetitive Stress Injury by analyzing the hand positions on devices such as keyboards that may result in excessive strains on the hand. The loads on the tissue surrounding the wrist joint are analyzed to determine and define safe exposure limits.

It is therefore an object of the present invention to provide a system and method for recovering material properties of non-rigid objects when only partial information relating the material properties is available.

It is a further object of the present invention to provide a system and method for the non-invasive analysis of scarred skin.

It is another object of the present invention to provide a system and method for recovering missing geometry in a non-rigid object.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

Figure 1:
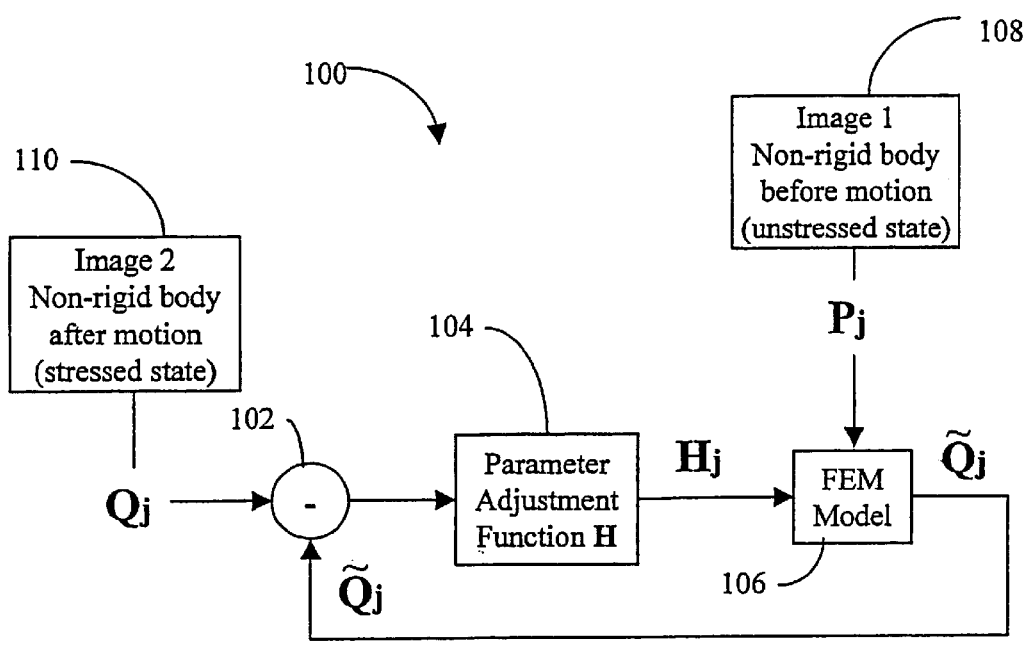
FIG. 1 is block diagram illustrated the general method of the present invention.

Referring to FIG. 1, a high-level block diagram 100 illustrating the general method of the present invention is shown. In particular, the method employs the use of a strain-based Finite Element Model (hereinafter FEM) 106 of the non-rigid body to be analyzed. The FEM 106 models both known and estimated material properties of the non-rigid body.

A first image 108 is obtained of the non-rigid body before it is subjected to a force that causes motion. That is, the object is in an unstressed state. From the first image 108, a first set of feature correspondences Pj, where j is equal to the number of feature correspondences, is generated. A feature correspondence is a point or points located on the non-rigid body that are tracked in three-dimensions by the method of the present invention through a sequence of images representing the non-rigid body undergoing motion from a first position (unstressed) to a second position (stressed). So defined, a feature correspondence can be, for example, one or more physically distinctive features on the non-rigid body, randomly selected points on the non-rigid body, or, more preferably, a series of nodes generated from a grid overlying the non-rigid body (see FIGS. 4, 6, and 8a–8c). In the preferred embodiment, intensity information from each image is used to find grid intersections using snakes and range data is employed to determine the three-dimensional coordinates of the feature correspondences. The range data is obtained via a conventional range finder that measure distances.

The FEM 106 is created automatically from the first set of feature correspondences Pj and the included known and estimated material properties. In particular, the method creates a three-dimensional geometric mesh of the non-rigid body using the first set of feature correspondences Pj and known and estimated material properties. For example, if the physically-based model is that of human skin, a three-dimensional geometric mesh representing the skin is derived from the first set of feature correspondences Pj and known and estimated material properties of human skin such as, for example, average skin elasticity, average skin thickness and other material properties. Closely connected therewith, if the physically-based model is that of a manufactured product such as, for example, rubber sheeting, where the material properties are known in advance, the FEM 106 can be generated using more precise material property information rather than averages or global values. In any event, precise material properties are not necessary because, as will be described, the method of the present invention recovers these properties relative to the known or estimated material properties based on an analysis of strain distribution across the non-rigid body.

Figure 6:
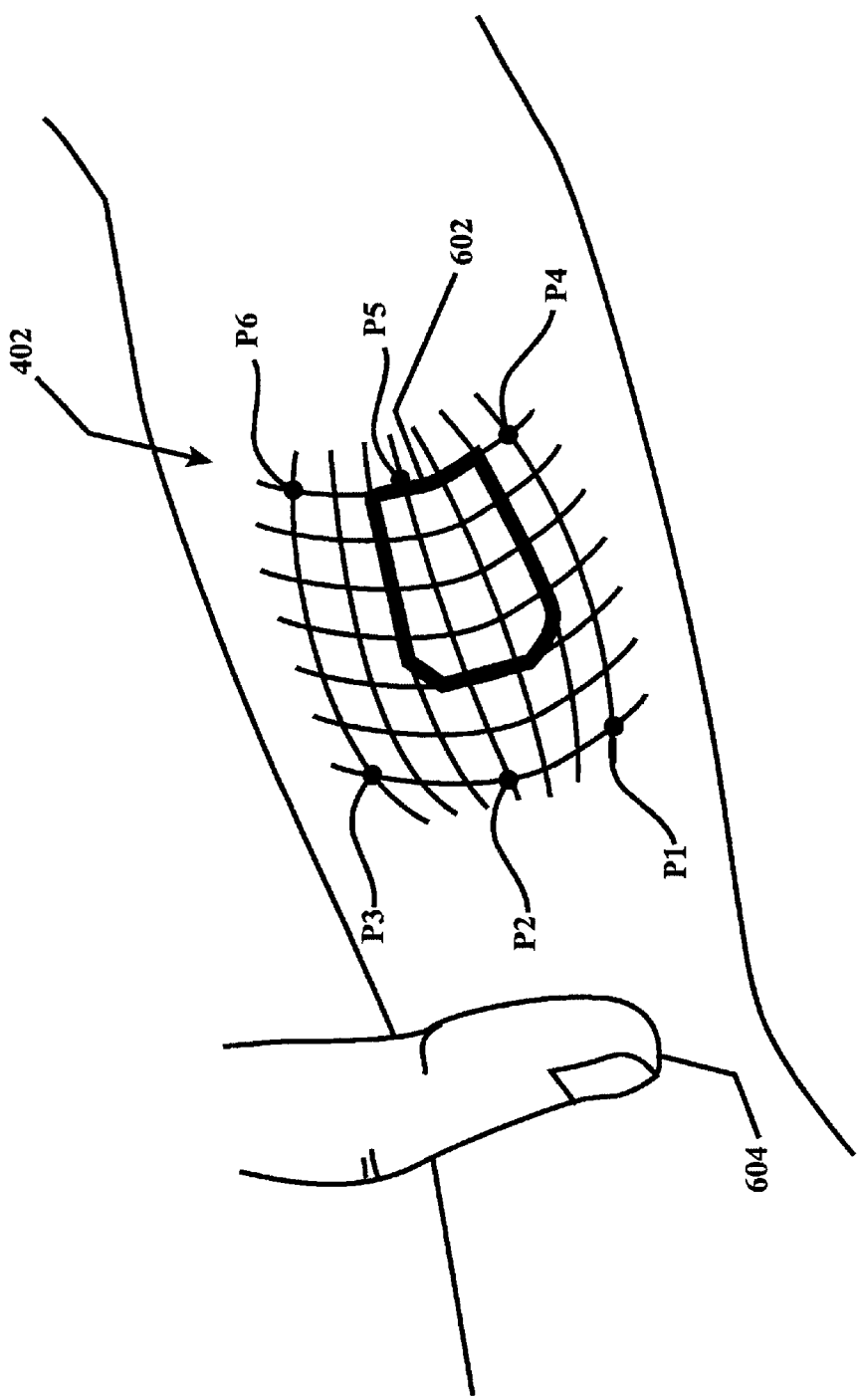
FIG. 6 is a diagram illustrating an image of a patient's arm having a burn scar while being subjected to a compressor.

Still referring to FIG. 1, a second image 110 is obtained that represents the non-rigid body after motion (i.e., stressing) has occurred (see FIG. 6). In a similar fashion to the first set of feature correspondences Pj, a second set of feature correspondences Qj are generated from the second image 110. The second set of feature correspondences Qj correspond to the motion displaced first set Pj.

A subset of the second set of feature correspondences Qj representing boundary correspondences is input into the FEM 106, which then generates a predicted set of feature correspondences $\tilde{Q}j$ based thereon. The predicted set of feature correspondences $\tilde{Q}j$ are compared to the second set of feature correspondences Rj on a node-by-node basis to determine the error, if any, between the two sets of correspondences at 102. Large errors indicate that FEM 106 requires refining. The threshold of whether an error is "large" and triggers refinement of the FEM 106 is often determined on a case-specific basis. In any event, the minimum error obtainable is limited to the noise level of the images, which dictates preciseness of the image information. The noise level of an image is generally characterized by the signal-to-noise ratio of the equipment acquiring the image.

If the FEM 106 requires refinement, a parameter adjustment function H 104 using an iterative descent method (to be described) is performed to modify the material properties of the FEM 106. Boundary correspondences are input into the refined FEM 106, which generates another set of predicted feature correspondences $\tilde{Q}j$. The predicted set of feature correspondences $\tilde{Q}j$ are again compared to the second set of feature correspondences Rj on a node-by-node basis to determine the error, if any, between the two sets of correspondences. This procedure is repeated until the error between the predicted set of feature correspondences $\tilde{Q}j$ and the second set of feature correspondences Rj is a global minimum. Once the error is determined to be global minimum, the strain-based FEM 106 includes the correct value of Young's modulus for each element therein. Knowing the correct value of Young's modulus allows for the recovery of material properties which were not known or only estimated at the onset of the procedure.

Figure 2:
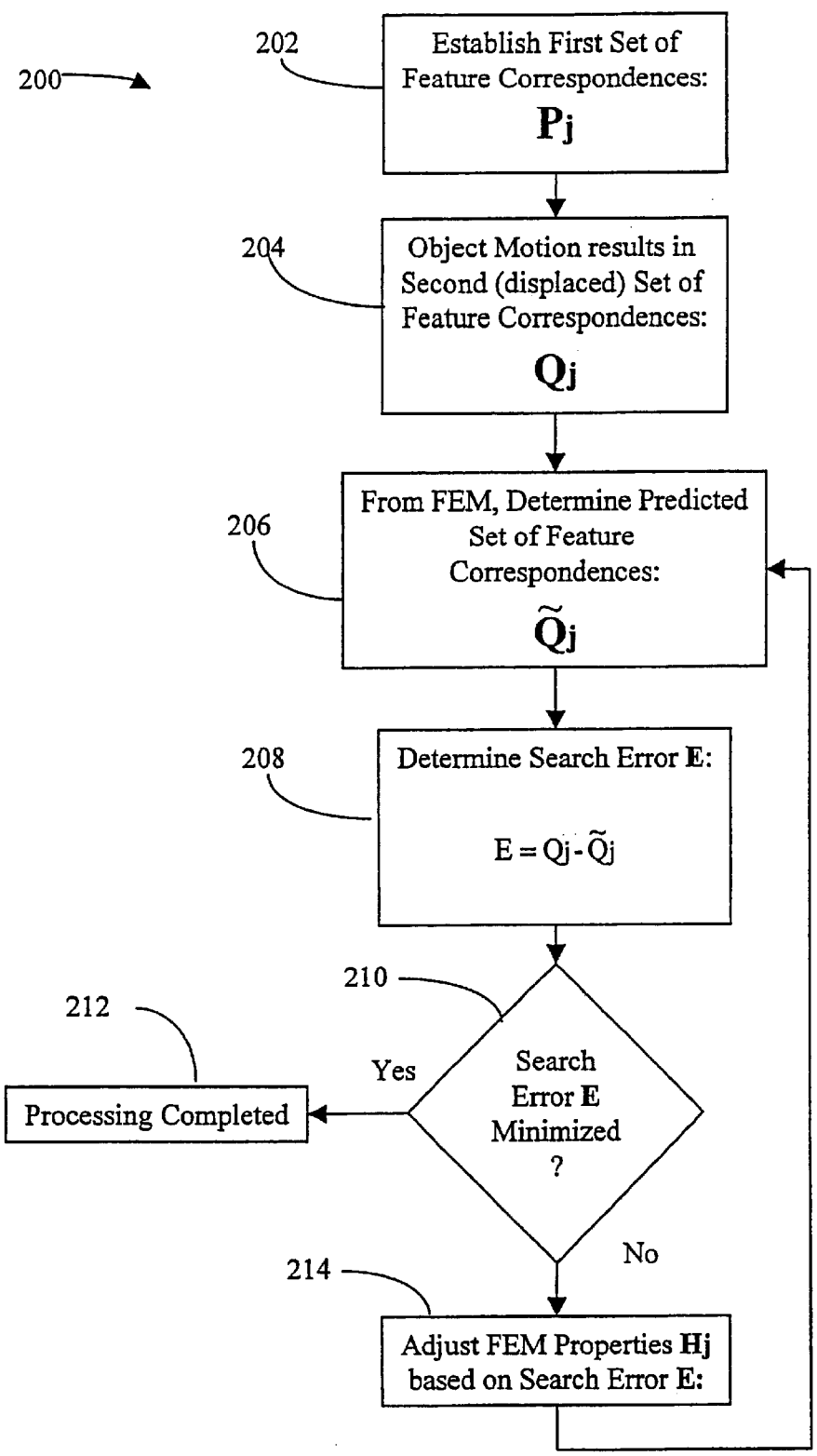
FIG. 2 is a flowchart illustrating the steps of the general method of the present invention.

Referring now to FIG. 2, a flowchart 200 illustrating the steps of the present invention is shown. The procedure begins in step 202 where snakes are used to find feature correspondences Pj for grid intersections. The first task is to automatically detect the grid points in two intensity images (see FIGS. 4, 6, and 8a–8c). Conventional active contour models, or snakes, allow for the detailed incorporation of grid information such as the geometry of the grid, including the exact number of vertical and horizontal lines. The use of snakes as a mechanism for finding and tracking salient image contours is conventional. In the preferred embodiment, the feature correspondences correspond to the three-dimensional coordinates of nodes of the grid.

In step 204, a force is applied to the non-rigid object that causes the first set of feature correspondences to be displaced. (See FIGS. 6 and 8c). An image of the motion-displaced non-rigid body and range data associated therewith are employed to generate a second set of feature correspondences Qj that represent the motion-displaced first set of feature correspondences Pj. In step 206, a sparse set of feature correspondences representing boundary points (hereinafter referred to as keypoints) are input into the strain-based FEM to determine a predicted set of feature correspondences $\tilde{Q}j$. The predicted set of feature correspondences $\tilde{Q}j$ represent three-dimensional coordinates of the predicted grid nodes as defined by the finite elements of the FEM 106. In step 208, a search error is determined by the following equation:

$$E = Qj - \tilde{Q}j$$

where, as described above, Qj represents the second set (i.e., motion displaced) of feature correspondences, and $\tilde{Q}j$ represents the predicted set of feature correspondences.

In step 210, a determination is made as to whether the search error E is a global minimum. Initially, it is not know whether the first determination of the search error E is a minimum because this determination is made relative to further iterations and determinations of subsequent search error E values (to be described). Therefore, at least two iterations are necessary to determine whether the search error E is a global minimum. If the search error E is a global minimum, then processing is complete and stops at step 212. A minimum global search error indicates that the error between the predicted set of feature correspondences and the second set (i.e., motion-displaced) of feature correspondences has been reduced to a minimum for the given system. Connected therewith, a minimum global search error indicates that the strain-based FEM is an accurate physical model of the non-rigid object such that material properties can now be recovered. However, if the search error E is not a global minimum, the process advances to step 214 where the properties of the FEM 106 are adjusted based on the search error E. For example, the Young's modulus of certain finite elements of the FEM 106 may be adjusted. Additionally, other material properties of the FEM 106 can be adjusted, if appropriate, such as finite element material thickness and size. After step 214, the process loops back to step 206 where the sparse set of keypoints are input into the modified strain-based FEM to determine another set of predicted feature correspondences $\hat{Q}j$ until the search error is a global minimum.

The present invention will now be described in the context of skin burn scar assessment. Two million people are burned annually in the United States—300,000 of which seriously. Burn scars as well as other scars, which appear as products of successful wound healing, differ from surrounding normal skin in several important ways such as, for example, color, texture, size and shape. Nevertheless, despite these differences, the ability to objectively detect wounded, healing, or scarred skin in a non-invasively manner is very limited. Quite often the assessment is a consensus of the subjective opinions of medical professions, which may or may not be correct. These opinions are typically made from the medical professional's visual observation of the affected skin. As described above, invasive observation and analysis is rarely practiced since it would further damage the healing skin. The consensus of the subjective opinions is then used to determine the choice of healing techniques that, once again, may or may not be proper. The present invention provides an objective approach to skin burn scar assessment that allows the recovery of healing or scarred skin properties.

Figure 3:
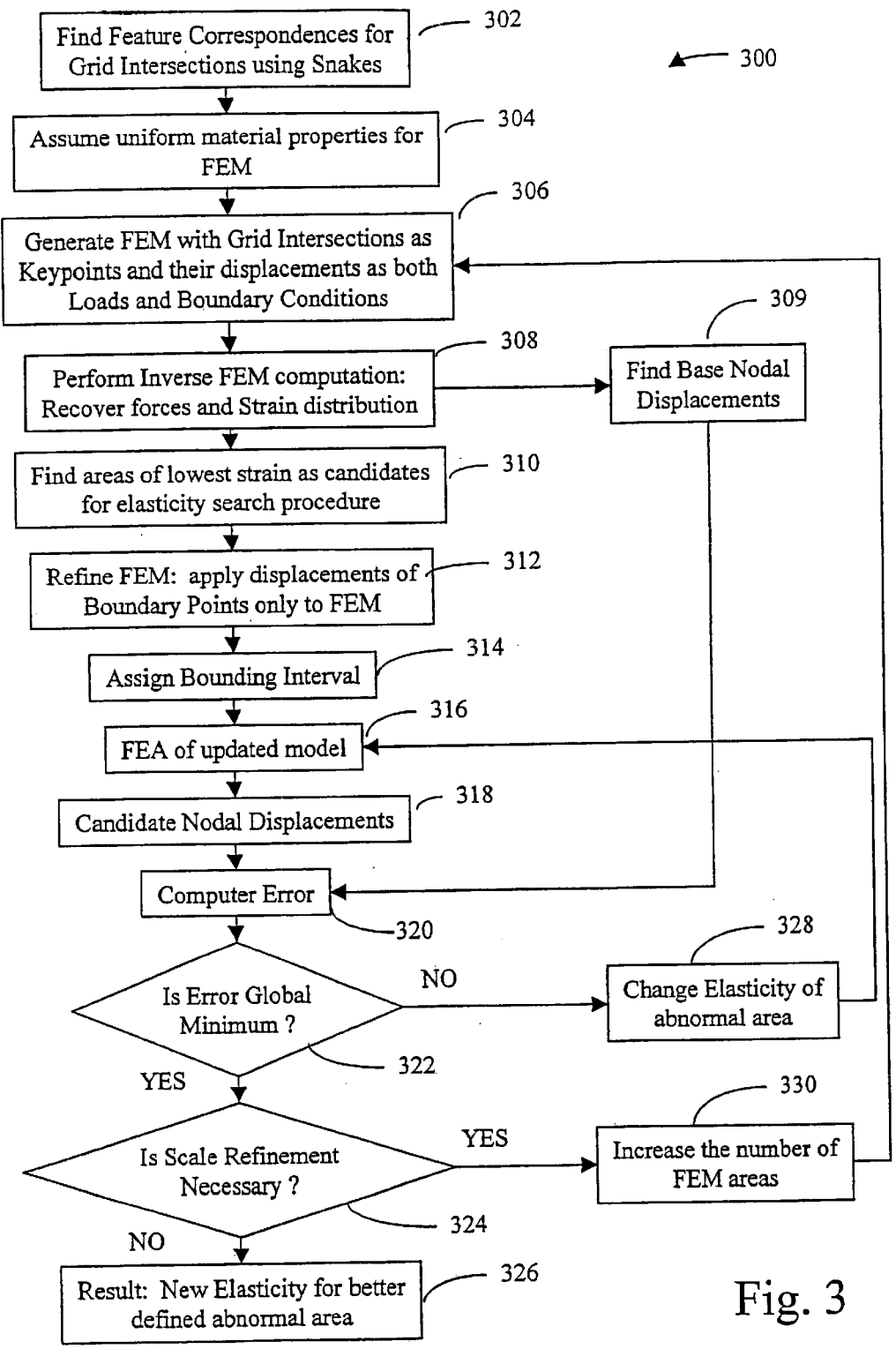
FIG. 3 is a detailed flowchart illustrating the steps of the present invention.
Figure 4:
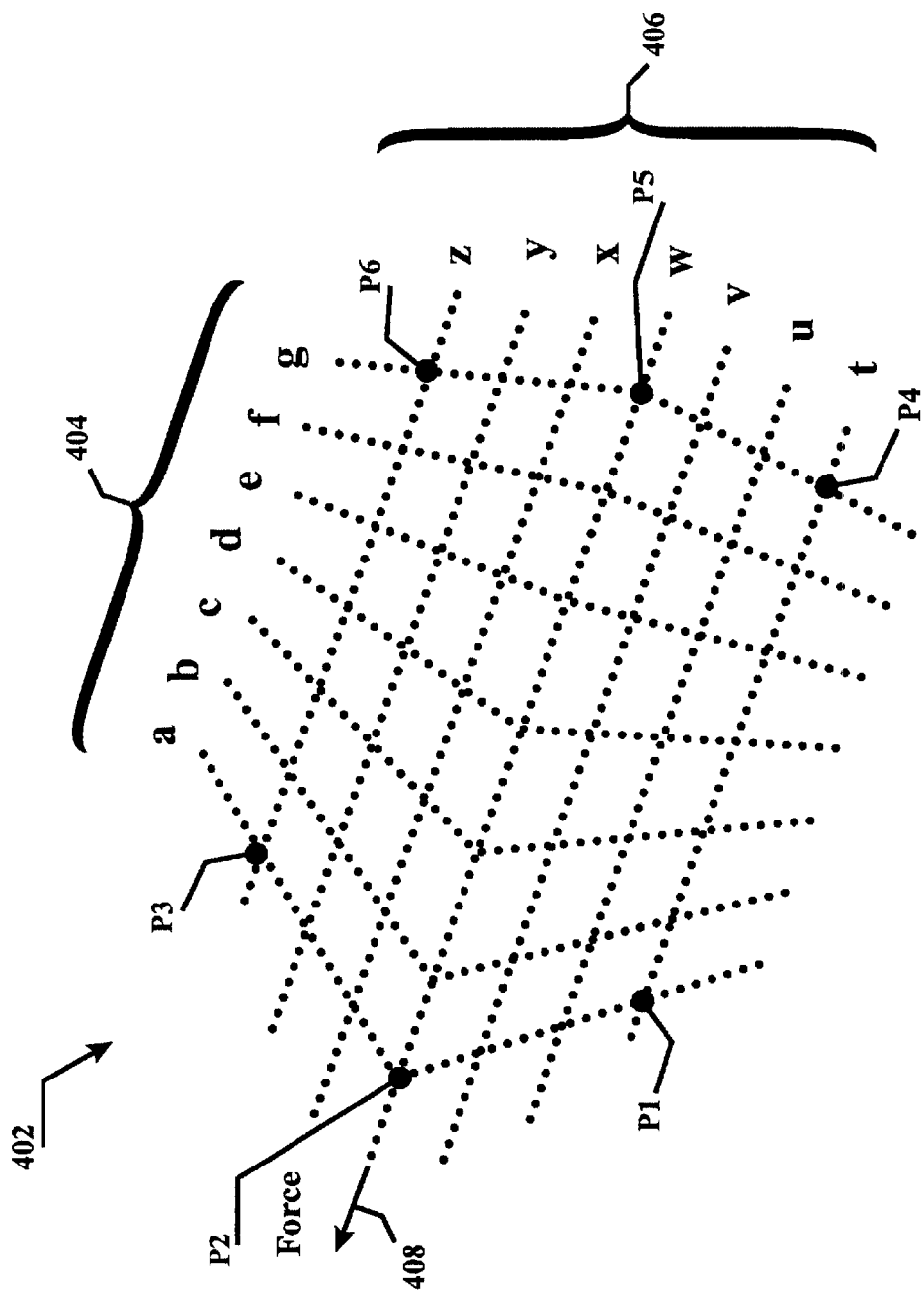
FIG. 4 is a diagram illustrating a grid of the present invention subject to a force.

Referring now to FIGS. 3 and 4, a flowchart of the method is illustrated. Starting at step 302, process locates the first set of feature correspondences $P_j$ for grid intersections using snakes. As described earlier, this occurs by detecting the grid points in two intensity images. The use of snakes allows the incorporation of grid geometry, including the exact number of vertical and horizontal lines, as a mechanism for finding and tracking salient image contours associated with the grid. A fast greedy algorithm for finding the minimum energy contour defines the total energy E of a snake as consisting of the continuity energy, the curvature energy and the image energy $$E = \int (a)(s)E_{cont}(s) + \beta(s)E_{curv}(s) + \gamma(s)E_{imag}(s))ds \quad (1)$$

where s denotes the arc-length along the snake.

As shown in FIG. 4, the grid 402 includes a set of intersecting lines 404 and 406. The grid 402 has a lower image intensity than the background. Each grid line "a-g" and "t-z" is tracked by a separate snake. There are a total of seven grid lines in each of two directions. Preferably, the number of control points in each snake is set to 80. However, more or less control points may be used based on the resolution of the image. For sake of clarity, FIG. 4 show approximately 40 control points in each snake.

While the use of snakes is conventional for grid tracking, there are several unconventional aspects to the present invention's employment thereof. Namely, the grid lines 404 and 406 are placed in a non-uniform way due to perspective projection of the three-dimensional scene of the object (e.g., the healing or scarred skin). As a result, some grid lines a-g and t-z are several times closer to each other than other grid lines in the same image. Additionally, displacements are large and non-uniform and stretching of the object changes the shape of initially straight grid lines 404 and 406. Hence, the shape of the grid lines 404 and 406 in the image after stretching the object should be approximated by curves, or at least with more than one line segment. Moreover, the angle between two sets of grid lines is not 90 degrees—it varies depending on the position of the object.

The initialization of the snakes will now be described. As shown in FIG. 4, there are two sets of intersecting grid lines 404 and 406 to track. Stretching the non-rigid object (e.g., healing or scarred skin) usually affects one set of grid lines such as, for example, grid lines 404, more than the other set of grid lines (i.e., 406). This condition is ensured by the direction in which we pull the skin as indicated by force 408. More generally, the condition is ensured by always pulling along the direction of one set of grid lines. A total of six points P1–P6 are needed to identify the region where initial placement should occur: four corner points P1, P3, P4, and P6 and two more points P2 and P5 to better approximate lines from grid lines 404. The initial snake lines are placed at equal distances within the edges of a hexagon formed by connecting these six points.

Snake control points, or snaxels, within the lines from grid line set 406 are placed at increments defined by the following equation:

$$\Delta x = (x_n - x_1) r_1 / n$$
$$\Delta y = (y_n - y_1) r_1 / n \quad (2)$$

where $(x_i, y_i)$ and $(x_n, y_n)$ are the two initial "end points" of a line, n is the number of control points on the line and $r_1$ is a ratio (normally between 1.1 and 1.2) to compensate for lines stretching past the "end points." This factor has been found to provide reliable connectivity between lines. Otherwise some grid line intersections may be lost and some feature correspondences may not be found. The control points on the grid lines are determined using the following equation:

$$x_i = x_1 + (\Delta x)(i - n/r_2)$$
$$y_1 = y_1 + (\Delta y)(i - n/r_2) \quad (3)$$

where i is the index of the control point and $r_2 = 2/(r_1 - 1)$. Like $r_1$, the ratio $n/r_2$ assures that the boundary lines intersect. Lines from the set of grid lines 404, undergoing the biggest deformation by virtue of the force perpendicular to them, are modeled similarly to the first set.

During the fitting stage, each snake iteratively minimizes its energy to track the exact contour of the corresponding grid line. The snaxel points move greedily per equation (1) thereby each shifting to a new location in its neighborhood where the total energy is a minimum. The choice of coefficients α, β and γ, in equation (1) is relatively simple for images before motion. Deformation of the grid 402 tends to be minimal and caused only by the natural shape and position of the location of the skin being analyzed (e.g., arm, leg, etc.) and, therefore, setting the coefficients to the same value is an effective solution. However, in order to allow a snake to follow a much larger deformation caused by stretching, α and β are preferably chosen as 0.65–0.75γ and 0.5γ, respectively, with γ=2.

When the fitting procedure terminates, the entire set of snakes should lie on the grid 402. The last step is computing the grid intersection points in the images before and after the motion and calculating their three-dimensional displacements using corresponding range data. The grid 402 intersection points are computed as the intersection points of the corresponding snakes. These points and their displacements are automatically fed into the strain-based FEM model and provide the foundation for the calculation of motion and deformation parameters. The strain-based finite element modeling of the present invention will now be discussed.

At step 304, the strain-based FEM of the present invention examines the displacements of grid points as reactions to the external forces applied to the non-rigid object (i.e., healing or scarred skin). From these observed displacements, the FEM estimates the material properties of the non-rigid object. This approach is an adaptation of the general inverse problem category. If the material properties of the non-rigid object are known, surface movement can be accurately characterized. The present invention employs a conventional ANSYS program for nonlinear FEM calculation. The finite element types used in the model are preferably elastic structural 3-D shells.

In the context of skin burn scar assessment, skin tissue characterization refers to the assessment of stiffness, tension, tightness, and/or pliability of skin. The skin is modeled as a non-rigid object undergoing motion. From a model-based estimation of the point-wise motion, the present invention validates the properties of the underlying tissues. Normal elastic skin allows almost unrestricted body movement. However, with scarring, skin material properties change and skin movement is restricted. Skin or soft tissue is a viscoelastic material and its material property is a combination of elastic solids and viscous liquids.

In addition, the mechanical properties a skin vary with location and direction. The mechanical behavior of skin is mainly affected by three of its components: elastin fibers network (20%), collagen fibers (72%), and the ground substance (4%). The mechanical properties of the collagen fibers and elastin network are nonlinear and the ground sources contributes to the viscosity of the tissue. Thus, the typical stress-strain relationship for skin is nonlinear. The behavior of skin at low strains is controlled by the elastin network and the collagen fibers dominate the behavior at high strains. The procedure of scar healing is accompany by the deposition of thick bands of collagen with no overall orientation pattern. As a result, whirl-like patterns, as opposed to parallel patterns, are found in the scarred skin. This healing process, therefore, changes the mechanical properties of the skin and its deformation with respect to various applied stresses.

The theory of elasticity shows that the response of a solid body to external forces is influenced by the geometric configuration of the body as well as the mechanical properties of the material. Elastic materials are materials in which deformation and stress disappear with the removal of external forces. Generally, stress is defined as the average force per unit area as the area approaches zero. A stress vector $\bar{p}$ can be defined as having normal σ and perpendicular τ components. The strain ε is defined as the change in displacement u with the change in length x:

$$\varepsilon = \frac{\partial u}{\partial x}$$

The modulus of elasticity, or Young's Modulus E, can be defined as follows:

$$E = \frac{\Delta \sigma}{\Delta \varepsilon}$$

where Δσ is the stress change and Δε is the strain change. The stress σ can be defined as force per unit area and the strain ε can be defined as changes in length per unit area. The general state of stress in stress-strain relations, as preferably employed by the present invention, are defined by Hooke's law and will not be repeated here.

Nonlinear analysis must be considered if large displacements occur with linear materials (i.e., geometric non-linearity), small displacements occur with nonlinear stress-strain relationships for structural materials (i.e., material non-linearity), or a combination of both effects. The type of geometric non-linearity accounted for by the present invention are large strains, which assume that the strains are no longer infinitesimal (i.e., they are finite). Also accounted for are shape changes and rotations. In particular, applied loads on a body make it move or deform from a first position $\bar{u}_1$ to a second position $\bar{u}_2$ with the vector displacement defined as follows:

$$\bar{u} = \bar{u}_2 - \bar{u}_1$$

A deformation gradient G can be defined as follows:

$$[G] = \frac{\partial \bar{u}_2}{\partial \bar{u}_1}$$

where the deformation gradient G includes the volume change, the rotation, and the shape change. The volume change at a point is defined as follows:

$$\frac{dV_2}{dV_1} = det[G]$$

where "det" denoted the determinant of the matrix [G]. The deformation gradient can be separated into a rotational and a shape change using the right polar decomposition theorem as follows:

$$[G]=[R][U_s] \qquad (4)$$

where [R] is the rotation matrix and [$U_s$] is the right stretch (shape change) matrix. Once a stretch matrix is known, a logarithmic or Hencky strain measure is defined as follows:

$$[\varepsilon]=\ln [U_s]$$

or equivalently, through the spectral decomposition of [$U_s$] as follows:

$$[\varepsilon] = \sum_{i=1}^{3} \ln(\lambda_i) e_i e_i^T$$

where $\lambda_i$ are eigenvalues of [$U_s$] (principle stretches) and $e_i$ are eigenvectors of [$U_s$] (principle directions). Hence, from equation (4), the average rotation at a point can be calculated. Incremental approximations are used to compute the increment of the deformation gradient at the current time step n as follows:

$$[\Delta G_n] = [G_n][G_{n-1}]$$

Skin exhibits a highly nonlinear stress-strain relationship and has been shown to be anisotropic. Therefore, the present invention employs an energy-based material model with hyper-elastic shell elements and large strain integration and analysis. In the preferred embodiment, the FEM is local—only that part of the object (i.e., forearm, arm, leg etc.) with the grid 402 painted thereon is considered.

Summarizing, the aforementioned grid tracking in step 302 using snakes provides necessary information about the keypoints used to build a FEM's geometry in step 304 and determine the displacements in step 306. Locations of the keypoints are converted into three-dimensional coordinates using range information. The keypoint information is then input directly into the strain-based FEM in step 306. The FEM then generates areas of the model that approximate forearm (i.e., skin location) geometry. Similarly, from the image(s) after motion, the node displacements (i.e., three-dimensional coordinate information) are determined.

In steps 308 and 310, locations of abnormalities are determined by computing the strain level throughout the skin surface with the FEM. Normal skin usually has a relatively even distribution in the middle of the area of observation (i.e., middle of grid 402 of FIG. 4). Abrupt variations in skin strain levels indicate the existence of an area with different material properties. Areas with the lowest strain normally coincide with the true location of the abnormalities. Consequently, skin regions with low strains other than the boundary regions are predominantly abnormal. Such regions are identified in step 310 based on the computed strain level of the finite skin elements.

Generally, the stress field of compressed soft tissue is high near the boundaries of the compressor and decreases with distance from these boundaries. In this regard, the present invention subscribes to the opposite effect—both stress and strain are the lowest near the boundaries of the grid 402, except for the boundary where the force is applied, unless an abnormality is detected inside the area.

According to the present invention, displacements are applied only to the boundary points and the values of unknown elasticity are varied in steps 312 and 328. In this regard, the predicted displacements of the nodes, as generated by the strain-based FEM, also change. If the correct elastic properties for both boundary and internal nodes of the FEM are known, then the displacements of all of the object's points will be equal to the motion between the two time frames calculated using available range data. Hence, the present invention compares the predicted nodal displacements with the base displacements and estimates the difference that would refine the strain-based FEM until the correct value of Young's modulus is determined for each element. True nodal displacements are known not only for the keypoints as a result of the snake fitting procedure to the grids on the images before and after the motion (step 309), but also for all of the nodes as a result of the inverse FEM computation at step 308. Since sampling of the nodes is more dense than sampling of the keypoints, better error estimation precision is provided.

The initial, un-refined, FEM incorporates displacements of all keypoints as both loads and boundary conditions. However, all subsequent FEM computations use a somewhat different model that ignores displacements of interior grid intersection points. In this manner, correct elasticity is a cause of correct displacements of such boundary and interior grid intersection points by participating in the faithful propagation of only the boundary displacements. An important outcome of steps 308 and 310 is initial localization of abnormal (less elastic) area(s) based on base nodal displacement between the two images of the non-rigid object. It usually coincides with the lowest strain on the surface of the object. This area(s) is the place where the material properties that contribute to the total error are gradually changed.

In step 314, a bounding interval is assigned that is preferably equal to the distance between two control points or snaxels. The bounding interval is used in the iterative descent approach to arrive at the correct value of Young's modulus for each element of the FEM (to be described). In step 316, the FEM is updated with using the present value of Young's modulus for each finite element thereof. In step 318, the candidate nodal displacements are identified based on low strain for use in the error function calculation of step 320.

In step 320, the error is computed by comparing true displacements of the nodes (or keypoints) after the motion with a change in positions of nodes (keypoints) predicted by the FEM incorporating the current value of Young's modulus of the burn scar. The error is defined per node or keypoint as shown in step 208 of FIG. 2. After the error is determined, the process advances to step 322. In step 322, a determination is made as to whether the error is a minimum. If the error is a minimum, the process advances to step 324 where a determination is made as to whether finite element scale refinement is necessary. Scale refinement is necessary where there are too few elements in the FEM for reliable error minimization. If scale refinement is not necessary, the process advances to step 326 where a new elasticity or Young's modulus for the abnormal area is recovered. If scale refinement is necessary, the process advances to step 330 and increases the number of finite elements in the FEM. The increase can be accomplished by uniformly multiplying the present number of finite elements in the FEM by a scale factor. After step 330, the process loops back to step 306 for further processing.

On the other hand, if in step 322 the error is not a global minimum, the process advances to step 328 where the elasticity of the abnormal area is changed in the FEM. After step 328, the process loops back to step 316 where finite element analysis (FEA) is used to update the relevant finite elements of the FEM with the new elasticity value.

Figure 5:
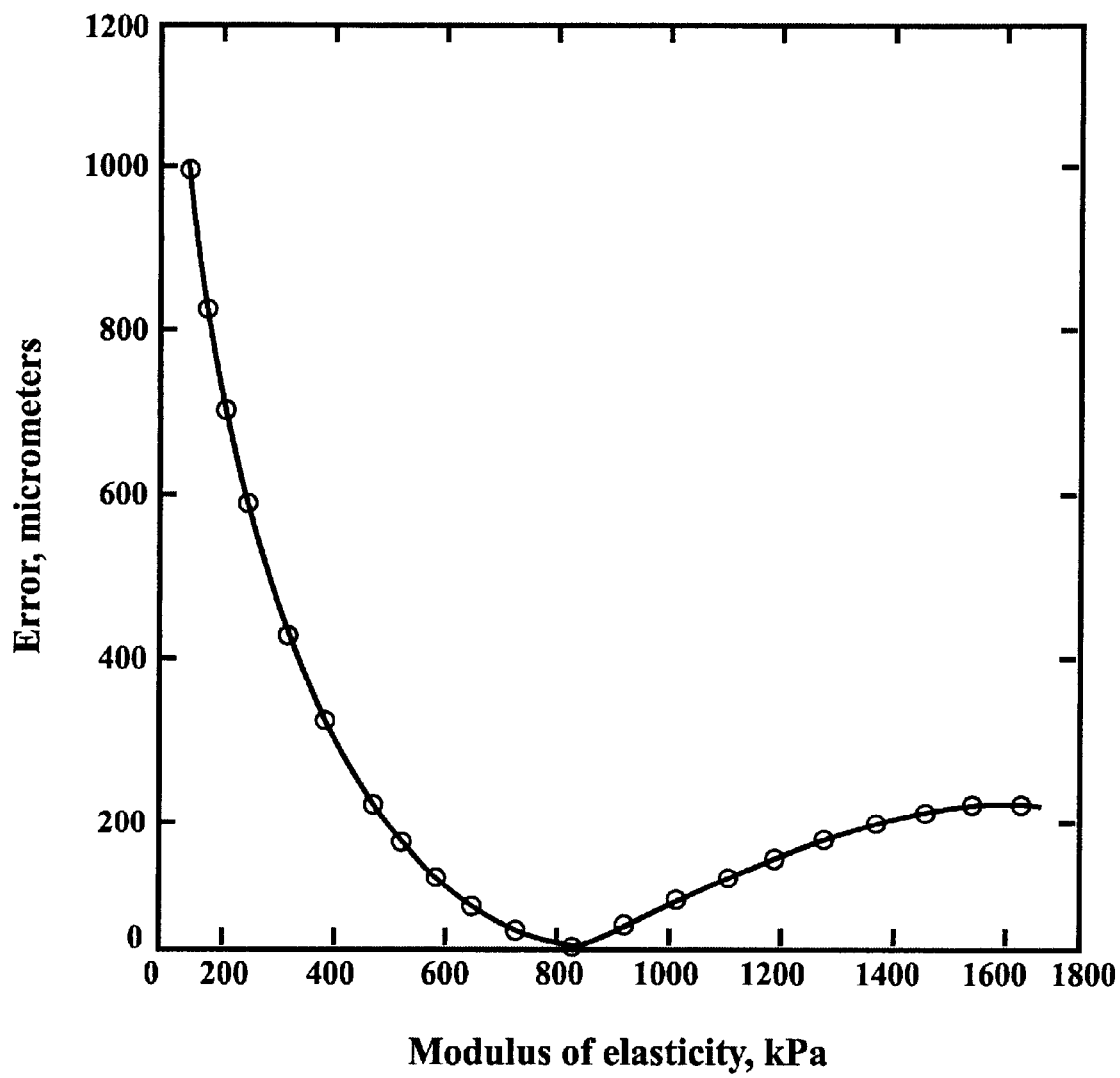
FIG. 5 is chart of an error function relating to elastic materials of the present invention.

FIG. 5 is a graph of an error function derived experimentally as a result of investigating properties of elastic materials. FIG. 5 is scaled per node with circles representing sampled points and lines denoting results of interpolation. Because the graph of FIG. 5 evidences general similarities in error functions for various elastic materials, error minimization can be applied. The present invention preferably employs the conventional Brent's method in one dimension for error minimization. More specifically, Brent's method attempts to utilize parabolic interpolation in minimizing the error function. Preferably, a parabolic step employed by the present invention must fall within a bounding interval ($x_1$, $x_2$) and imply a movement from a best current value that is less than half the movement of the step before the last to ensure convergence. The step before the last is chosen to allow the interpolation one "bad" step. The utility of providing this one "bad" step is that it provides a mechanism for removing the Young's modulus search out of any local extremum. The distance from a point already evaluated to a new point is proportionally limited by a pre-defined tolerance, which can be varied. Given that sufficiently smooth functions are parabolic near their minimums, a parabola fitted through any three points of the error function will find a point close to the minimum in a single step. In the present invention, inverse parabolic interpolation is employed to find an abscissa x that is the minimum of a parabola through three points f(a), f(b), and f(c) of the error function by the following equation:

$$x = b - \frac{1}{2} \frac{(b-a)^2[f(b)-f(c)] - (b-c)^2[f(b)-f(a)]}{(b-a)[f(b)-f(c)] - (b-c)[f(b)-f(a)]}$$

In the worst-case scenario where parabolic steps are not successful in minimizing the error, a conventional golden section search may be applied. Hence, depending on the behavior of the error function, the present invention alternates between these two error minimization approaches.

Error minimization utilizing the iterative descent approach of the present invention in steps 328, 316, and 318 takes place in the neighborhood of known elasticity. This neighborhood can be defined exactly based on the known properties of the first material (e.g., normal skin) and predicted behavior of a second material (e.g., healing or scarred skin). The minimum of the error function corresponds to the correct elasticity of the second material. Hence, the solution is based on a comparison of the nodal displacements obtained by a modification of Young's modulus of the abnormal areas (i.e., second material) with the base displacements. To summarize, true displacements are recovered for the keypoints from the images (before and after the motion) using snakes, and then for all nodes using the strain-based FEM. A similar procedure can be followed using level of strain as a guidance instead of displacements. However, the present invention prefers displacement analysis as it appears to be more precise for the case of burn scar analysis. Of course, the FEM can be further refined to increase the number of areas (i.e., more finite element model areas per grid area), as shown in step 330, in order to approximate more complicated shapes when needed.

Referring now to FIG. 6, a drawing of the ventral side of a patient's arm with grid 402 overlying a region of skin including a burn scar 602 is shown. The burn scar representation as shown in FIG. 6 and identified by reference numeral 602 for clarity in is not actually visible as such on the patient's arm. A compressor 604 such as, for example, a finger, applies a force to the patient's arm to cause grid displacement. Snakes successfully detect the grid points and assist in establishing feature point correspondences. The strain-based FEM is generated automatically using grid intersections to create keypoints and correspondences to find predicted displacements. Four keypoints P1, P3, P4, and P6 define an area that is then split-up into elements using an elastic shell-type of element with a thickness equal to the average thickness of normal skin. This average is preferably an average of the summation of thicknesses of the skin's layers. These layers preferably include the Epidermis, or outer layer, the Dermis and the Subcutaneous layer (or lower dermis). Material properties are selected based on the analysis of the following: Poisson's ratio is 0.49 based on the assumption that soft tissue is nearly incompressible and Young's modulus is selected from a range of elasticity from about 10 to 100 kPa, due to factor influencing skin average values.

Figure 7:
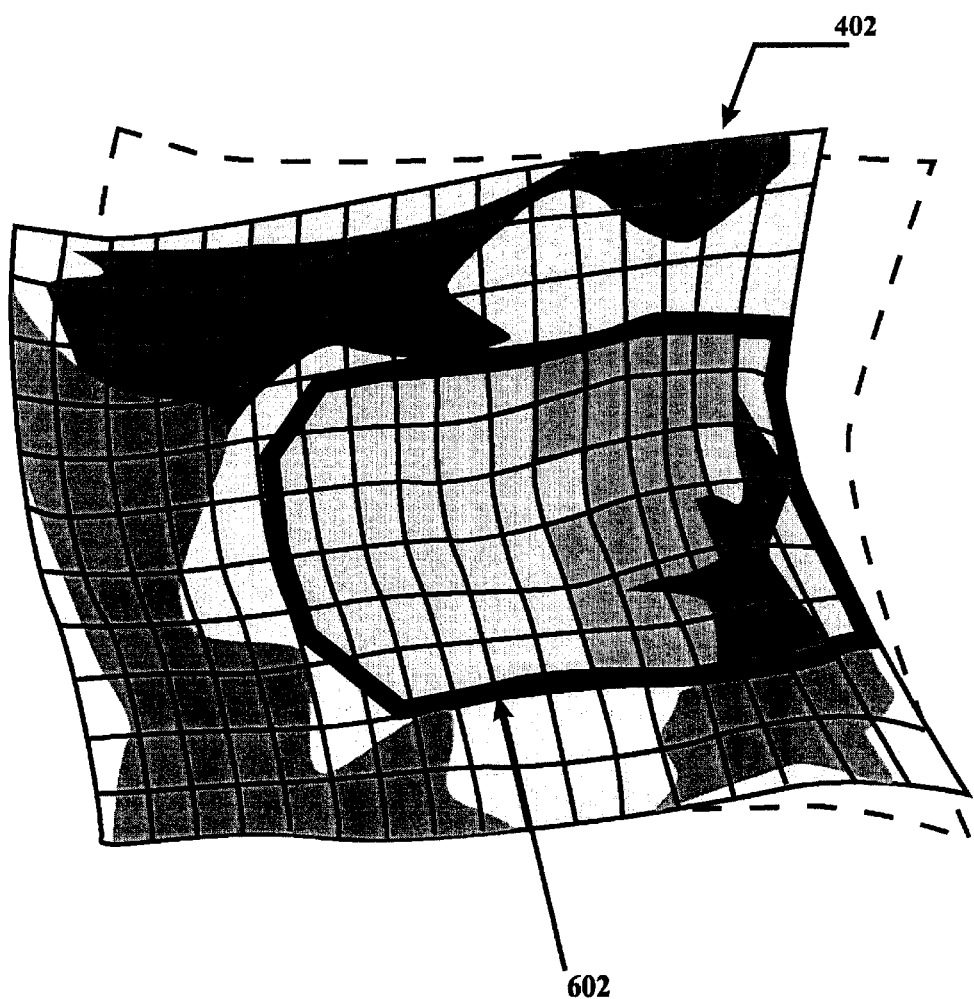
FIG. 7 is diagram illustrating a strain distribution of finite elements of the strain-based finite element model of the present invention.

Once the force by compressor 604 is applied, the displacements of the skin in the grid 402 area are adequate for identification low strain areas of the model that are candidates for iterative descent approach of the present invention to determine the correct value of Young's modulus. FIG. 7 is a diagram illustrating the strain distribution for the grid 402 area on a per finite element basis as generated by the strain-based FEM. The light areas of the diagram represent low strain areas of the FEM that are candidates for the iterative descent approach disclosed by the present invention for finding the correct value of Young's modulus for each finite element. Since there is a range of properties for the elasticity of normal human skin, as opposed to exact properties, it is preferable to employ relative rather then absolute values thereof. More specifically, this means defining the material properties of an abnormal area in multiples of normal skin properties.

Figure 8A:
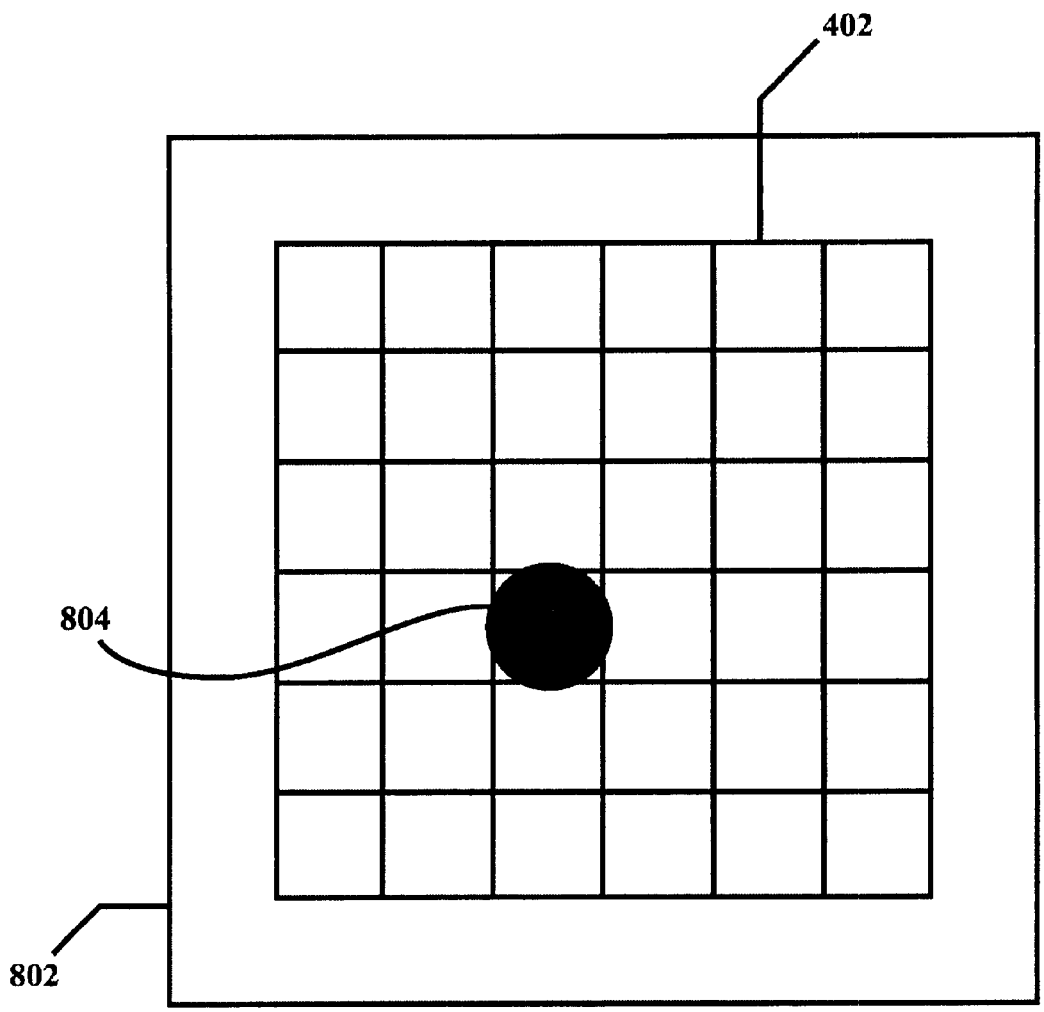
FIGS. 8a, 8b, and 8c are diagrams illustrating the recovery of missing geometry according to the present invention.
Figure 8B:
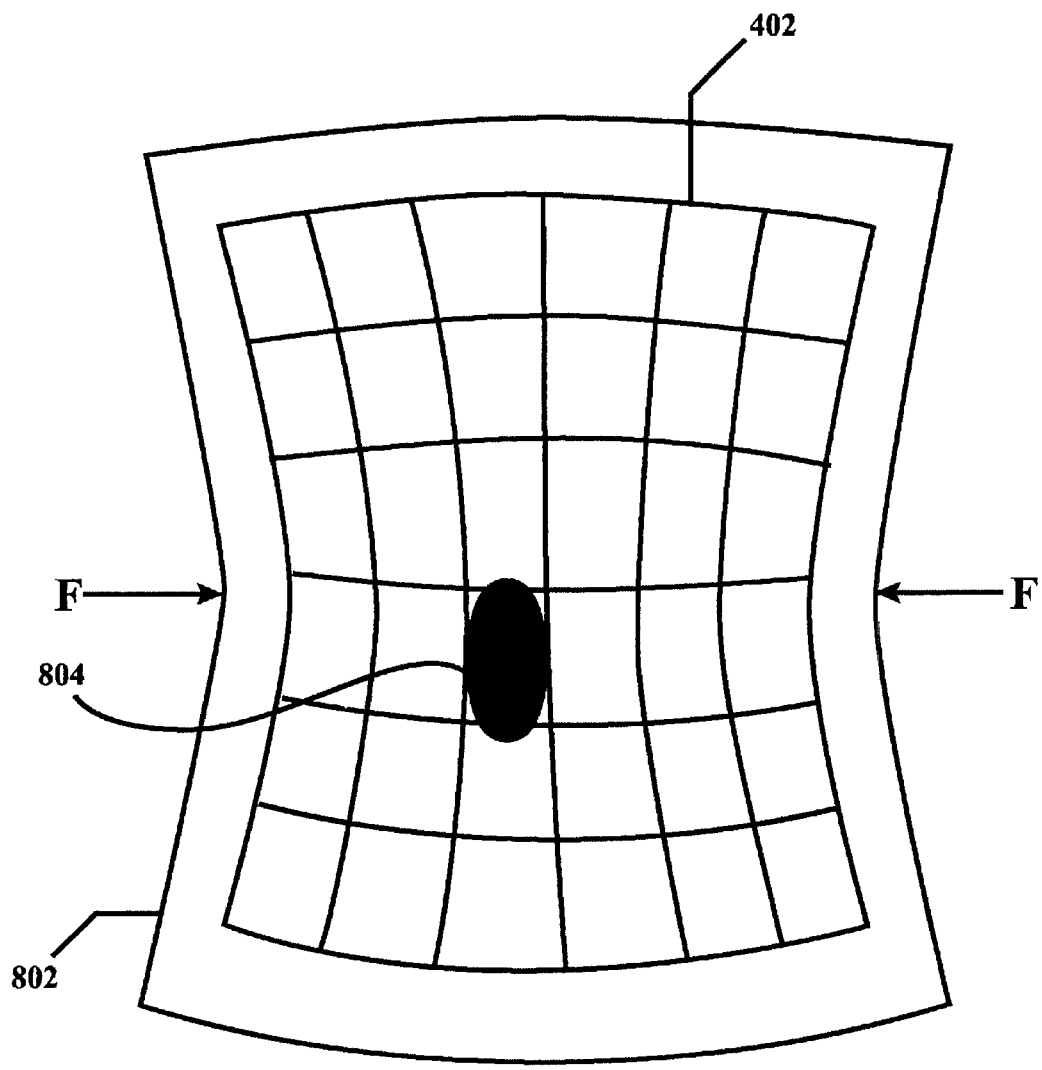
Figure 8C:
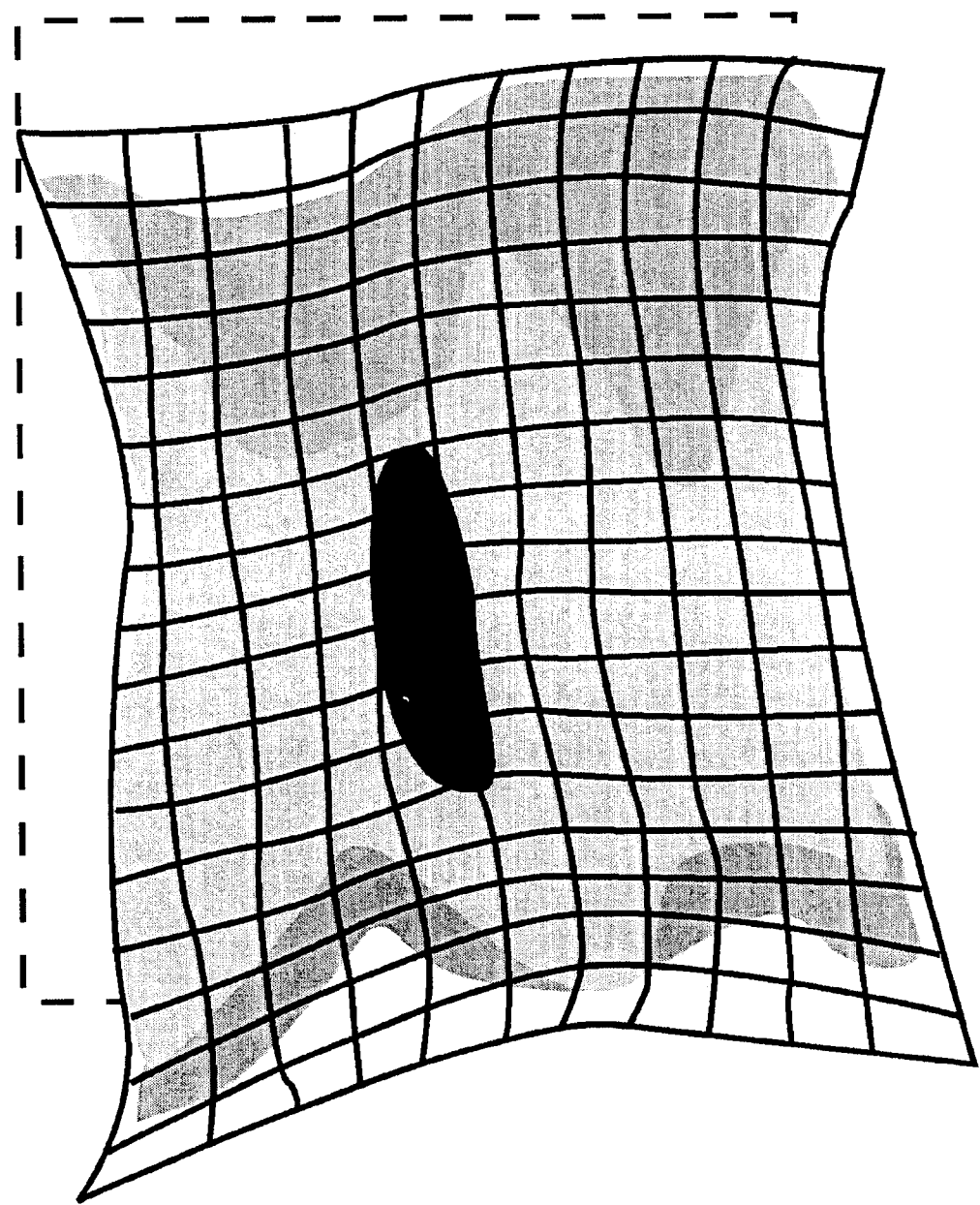

As described above, the present invention provides for the recovery of material properties including the Young's modulus of a non-rigid object. However, the present invention is not solely limited to the recovery of such a material property. More specifically, the present invention is also applicable to the recovery of missing geometry as a material property of a non-rigid object. For example, FIGS. 8*a* and 8*b* illustrate images of a sheet of material 802 having hole 804 therein and the grid 402 of the present invention. FIG. 8*a* represents an image of the sheet material 802 before motion displacement and FIG. 8*b* represents an image of the sheet material 802 after motion displacement. The sheet material 802 is modeled by a strain-based FEM with uniform properties, that is, without any information relating to the hole 804 (i.e., position, shape, and presence). In FIG. 8*b*, a compressing force F is applied to the sheet material 802 sufficient enough to cause deformation and displacement. As described above, grid intersection correspondences are input into the FEM to detect candidate areas of abnormal regions on the basis of strain distribution. Once the candidate areas have been detected, error minimization is employed via the iterative descent method of the present invention. However, in this case, varying of the value of Young's modulus of elasticity for error minimization does not provide a solution. This indicates that the detected region is a hole in the material. Since the region of interest is characterized by high strains this time, the bounding interval is characterized in the opposite direction as compared to low strain analysis. FIG. 8*c* is a diagram illustrating the FEM strain distribution where the dark regions thereof indicate areas of high strain and, therefore, candidate areas for material recovery by iterative descent. By varying the geometry of the region of interest, as opposed to the Young's modulus, the error can be minimized until the true geometry of the is recovered. In the method of FIG. 3, the steps are the same except that step 328 requires the function of changing the geometry of the abnormal area in this case instead of elasticity and step 326 results in the true geometry being recovered. The application of the present invention to the recovery of the precise geometry of a non-rigid object can be utilized for quality control in manufacturing elastic objects. Only a slight pressure is enough to cause deformations sufficient for the present invention to detect the problems with location or size of specific parts of the object.

The present invention is preferably implemented on a general or personal computer system. The system may have digital cameras and range finding devices in circuit communication therewith to obtain images and coordinate information of the object undergoing analysis. Alternatively, the images and coordinate information may be input a computer system having the present invention retained in the memory thereof as a computer program. The memory may be in the form of any one of a plurality of computer readable mediums including, for example, RAM, ROM, CD-ROM, or digital tape.

While the present invention has been illustrated by the description of embodiments thereof, and while the embodiments have been described in considerable detail, it is not the intention of application to restrict or in any way limit the scope of the appended claims to such detail. For example, the present invention can be applied to man-made elastic materials and human hand modeling in addition to bum scar assessment. Human hand modeling according to the present invention provides a valuable tool for the analysis of Repetitive Stress Injury by analyzing the hand positions on devices such as keyboards that may result in excessive strains on the hand. The loads on the tissue surrounding the wrist joint are analyzed to determine and define safe exposure limits. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A method of analyzing material properties of a non-rigid object comprising the steps of:
    (a) establishing a plurality of three-dimensional point correspondences of the non-rigid object in an unstressed and stressed state;
    (b) from the plurality of point correspondences, generating a finite element model of the non-rigid object having initial material properties and generating a finite element strain distribution;
    (c) detecting abnormal areas of the non-rigid object by comparing finite element strain levels from the strain distribution; and
    (d) determining at least one material property different than strain of the abnormal areas by:
        (1) establishing a plurality of boundary point correspondences from the plurality of point correspondences;
        (2) inputting the boundary point correspondences into the finite element model for generating a predicted set of three-dimensional point correspondences of the non-rigid object in the stressed state; and
        (3) changing the geometry and refining the at least one material property based on a comparison of the predicted set of point correspondences and the set of point correspondences of the non-rigid object in the stressed state until the predicted set of point correspondences and the set of point correspondences of the non-rigid object in the stressed state are within a minimum difference.

2. A method of analyzing material properties of a non-rigid body comprising the steps of:
    (a) inputting a first set of feature correspondences corresponding to the non-rigid body in an unstressed position into a finite element model of the non-rigid body;
    (b) inputting a second set of feature correspondences corresponding to the non-rigid body in a stressed position into the finite element model;
    (c) generating a strain distribution of the non-rigid body from the finite element model for identifying regions of high and low strain;
    (d) estimating an initial set of material properties different than strain of the non-rigid body from the strain distribution;
    (e) updating the finite element model with the estimated material properties different than strain of the non-rigid body;
    (f) inputting a set of boundary correspondences into the finite element model for generating a predicted set of feature correspondences of the non-rigid body;
    (g) generating an error by comparing the predicted set of feature correspondences with the second set of feature correspondences;
    (h) determining if the error is a minimum error; and
    (i) modifying the geometry of the areas of high stress and modifying a material property different than strain of the finite element model if the error is not a minimum error and repeating steps (f)–(i).

3. A computer-readable computer program product including a computer readable medium having computer program logic recorded thereon for determining at least one material property of a non-rigid object, the computer-readable computer program product comprising:
    (a) logic for establishing a plurality of three-dimensional point correspondences of the non-rigid object in an unstressed and stressed state;
    (b) logic for generating a finite element model of the non-rigid object having initial material properties and logic for generating a finite element strain distribution from the plurality of point correspondences;
    (c) logic for detecting abnormal areas of the non-rigid object by comparing finite element strain levels from the strain distribution; and
    (d) logic for determining at least one material property different than strain of the abnormal areas, wherein this logic for determining comprises:
        (1) logic for establishing a plurality of boundary point correspondences from the plurality of point correspondences;
        (2) logic for inputting the boundary point correspondences into the finite element model for generating a predicted set of three-dimensional point correspondences of the non-rigid object in the stressed state; and
        (3) logic for refining the at least one material property based on a comparison of the predicted set of point correspondences and the set of point correspondences of the non-rigid object in the stressed state until the predicted set of point correspondences and the set of point correspondences of the non-rigid object in the stressed state are within a minimum difference, wherein the logic for refining the at least one material property comprises the step of changing the geometry.

* * * * *